US012782325B2

(12) United States Patent
Lu et al.

(10) Patent No.: US 12,782,325 B2
(45) Date of Patent: Nov. 3, 2026

(54) GAS ANALYSIS SYSTEM

(71) Applicant: SHIMADZU CORPORATION, Kyoto (JP)

(72) Inventors: Wenjian Lu, Kyoto (JP); Shigeaki Shibamoto, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 268 days.

(21) Appl. No.: 18/839,954

(22) PCT Filed: Oct. 31, 2022

(86) PCT No.: PCT/JP2022/040610
§ 371 (c)(1),
(2) Date: Aug. 20, 2024

(87) PCT Pub. No.: WO2023/162348
PCT Pub. Date: Aug. 31, 2023

(65) Prior Publication Data

US 2025/0164453 A1 May 22, 2025

(30) Foreign Application Priority Data

Feb. 24, 2022 (JP) ................................ 2022-026555

(51) Int. Cl.
*G01N 30/40* (2006.01)
*G01N 30/02* (2006.01)
(Continued)

(52) U.S. Cl.
CPC ............. *G01N 30/40* (2013.01); *G01N 30/32* (2013.01); *G01N 30/468* (2013.01); *G01N 2030/025* (2013.01); *G01N 2030/328* (2013.01)

(58) Field of Classification Search
CPC .. G01N 30/88; G01N 2030/025; G01N 30/02; G01N 2030/027; G01N 2030/8804;
(Continued)

(56) References Cited

U.S. PATENT DOCUMENTS 5,071,547 A 12/1991 Cazer et al.
2009/0261245 A1 10/2009 Ochiai et al.
(Continued)

FOREIGN PATENT DOCUMENTS

CN 109313173 A 2/2019
JP H08-304368 A 11/1996
(Continued)

OTHER PUBLICATIONS

EESR dated Jan. 26, 2026 for corresponding application No. EP 22 92 8866.
(Continued)

*Primary Examiner* — Daniel S Larkin
*Assistant Examiner* — Anthony W Megna Fuentes
(74) *Attorney, Agent, or Firm* — Muir Patent Law, PLLC

(57) ABSTRACT

A gas analysis system (1) includes an inflow portion (C1) into which sample gas flows, a column (41, 42), a detector (50, 51) that detects a component in sample gas, a sampler module (M1) and a switching module (M2) including a plurality of valves (V1 to V10), and a controller (100) that independently controls the plurality of valves (V1 to V10). The controller (100) includes a storage (120) where function pattern information that defines correspondence between a plurality of basic functions and opening and closing patterns of the plurality of valves is stored and an output unit (110) that uses the function pattern information stored in the storage (120) to output control signals to the respective valves (V1 to V10).

5 Claims, 17 Drawing Sheets

(51) Int. Cl.

| | |
|---|---|
| ***G01N 30/32*** | (2006.01) |
| ***G01N 30/46*** | (2006.01) |
| ***G01N 30/88*** | (2006.01) |

(58) Field of Classification Search

CPC ................. G01N 30/38; G01N 30/461; G01N 2030/201; G01N 30/40; G01N 30/32; G01N 30/468; G01N 2030/328; Y02E 60/50

See application file for complete search history.

(56) References Cited

U.S. PATENT DOCUMENTS

| | | | |
|---|---|---|---|
| 2015/0369781 | A1 | 12/2015 | Zheng et al. |
| 2019/0162706 | A1 | 5/2019 | Shibamoto et al. |
| 2019/0285592 | A1 | 9/2019 | Yamamoto et al. |
| 2019/0331660 | A1 | 10/2019 | Nijsen et al. |

FOREIGN PATENT DOCUMENTS

| | | | |
|---|---|---|---|
| JP | 2004-101200 | A | 4/2004 |
| JP | 2006-064646 | A | 3/2006 |
| JP | 2009-257960 | A | 11/2009 |
| JP | 2016-080536 | A | 5/2016 |
| JP | 2019-095308 | A | 6/2019 |
| WO | 2018/105076 | A1 | 6/2018 |

OTHER PUBLICATIONS

Notice of Reasons for Refusal for corresponding Japanese Patent Application No. 2024-502822, dated Jul. 8, 2025.

PCT Written Opinion of the International Searching Authority for international application No. PCT/JP2022/040610, dated Jan. 17, 2023.

SAMPLING
P11: SAMPLING

PRE-CUT
P21: PRE-SEPARATION

HEART-CUT・COLUMN SWITCHING
P32: HEART-CUT

FIG.14

FUNCTION PATTERN INFORMATION

○OPEN
×CLOSED

| VALVE | | BASIC FUNCTION | | | | | | | | | |
|---|---|---|---|---|---|---|---|---|---|---|---|
| | | SAMPLING | | | PRE-CUT | | | HEART-CUT・COLUMN SWITCHING | | | BACK FLASH |
| | | P11 | P12 | P13 | P21 | P22 | P23 | P31 | P32 | P33 | P4 |
| M1 | V1 | ○ | ○ | × | × | × | × | × | × | × | × |
| | V2 | × | × | × | × | × | ○ | × | × | × | ○ |
| | V3 | ○ | × | × | ○ | ○ | ○ | ○ | ○ | ○ | ○ |
| | V4 | × | × | ○ | × | × | × | × | × | × | × |
| | V5 | × | × | ○ | × | × | × | × | × | × | × |
| | V6 | ○ | ○ | × | ○ | ○ | × | ○ | ○ | ○ | × |
| M2 | V7 | ○ | ○ | ○ | ○ | × | ○ | ○ | × | ○ | ○ |
| | V8 | × | × | × | × | ○ | × | × | ○ | × | × |
| | V9 | × | × | × | × | ○ | × | × | ○ | × | × |
| | V10 | ○ | ○ | ○ | ○ | × | ○ | ○ | × | ○ | ○ |

FIG.15

USER REQUEST INFORMATION

| CONTROL ORDER | FUNCTION REQUESTED BY USER | TIME DESIGNATED BY USER | |
|---|---|---|---|
| STEP 1 | SAMPLING | P11 | * * * |
| | | P12 | * * * |
| | | P13 | * * * |
| STEP 2 | PRE-CUT | P21 | * * * |
| | | P22 | * * * |
| | | P23 | * * * |

GAS ANALYSIS SYSTEM

TECHNICAL FIELD

The present disclosure relates to a gas analysis system (gas chromatograph system).

BACKGROUND ART

A gas analysis system (gas chromatograph system) is used in various fields such as management of quality and processes in petrochemical and gas manufacturing plants or researches into fuel cells. In order to achieve a plurality of functions (a sampling function, a heart-cut function, a pre-cut function, a column switching function, a back flash function, and the like) different in purpose, some of conventional gas analysis systems include a dedicated flow channel configuration in accordance with each function. For example, a gas analysis system disclosed in Japanese Patent Laying-Open No. 2004-101200 includes a flow channel configuration for achieving a pre-cut function with the use of a six-way valve and an eight-way valve.

CITATION LIST

Patent Literature

PTL 1: Japanese Patent Laying-Open No. 2004-101200

SUMMARY OF INVENTION

Technical Problem

In the conventional gas analysis system, a flow channel configuration such as a valve, a pipe, and the like is different for each requested function. Therefore, in change of the function of the analysis system, replacement with a flow channel configuration in accordance with that function and adjustment in accordance with the changed function should be made. Consequently, change of the function disadvantageously has required much time and cost.

The present disclosure was made to solve the problem described above, and an object of the present disclosure is to provide a gas analysis system capable of achieving a plurality of functions without replacement of a hardware configuration of a flow channel.

Solution to Problem

A gas analysis system according to the present disclosure includes a separator that separates a gas component contained in sample gas, a detector that detects the gas component that flows out of the separator, a flow channel fluidly connected to the separator and the detector, a plurality of valves provided on the flow channel, the plurality of valves being controllable independently of one another, and a controller that independently controls the plurality of valves. The plurality of valves are arranged such that the flow channel forms a first flow channel pattern and a second flow channel pattern in accordance with a controlled state of the plurality of valves. The controller includes a storage where information on the controlled state of the plurality of valves corresponding to the first flow channel pattern and the second flow channel pattern is stored and an output unit that generates signals for controlling respective ones of the plurality of valves based on the information stored in the storage and outputs the signals to the plurality of valves.

According to the gas analysis system, the plurality of valves are independently controlled so that the plurality of functions different in purpose from one another can be achieved. Therefore, the plurality of functions can be achieved without replacement of the hardware configuration of the flow channel.

Advantageous Effects of Invention

According to the present disclosure, the gas analysis system capable of achieving the plurality of functions without replacement of the hardware configuration of the flow channel can be provided.

BRIEF DESCRIPTION OF DRAWINGS

FIG. 14 is a diagram of a list of patterns of open and closed states of switching valves.

FIG. 15 is a diagram showing an exemplary function requested by a user.

DESCRIPTION OF EMBODIMENTS

Figure 1:
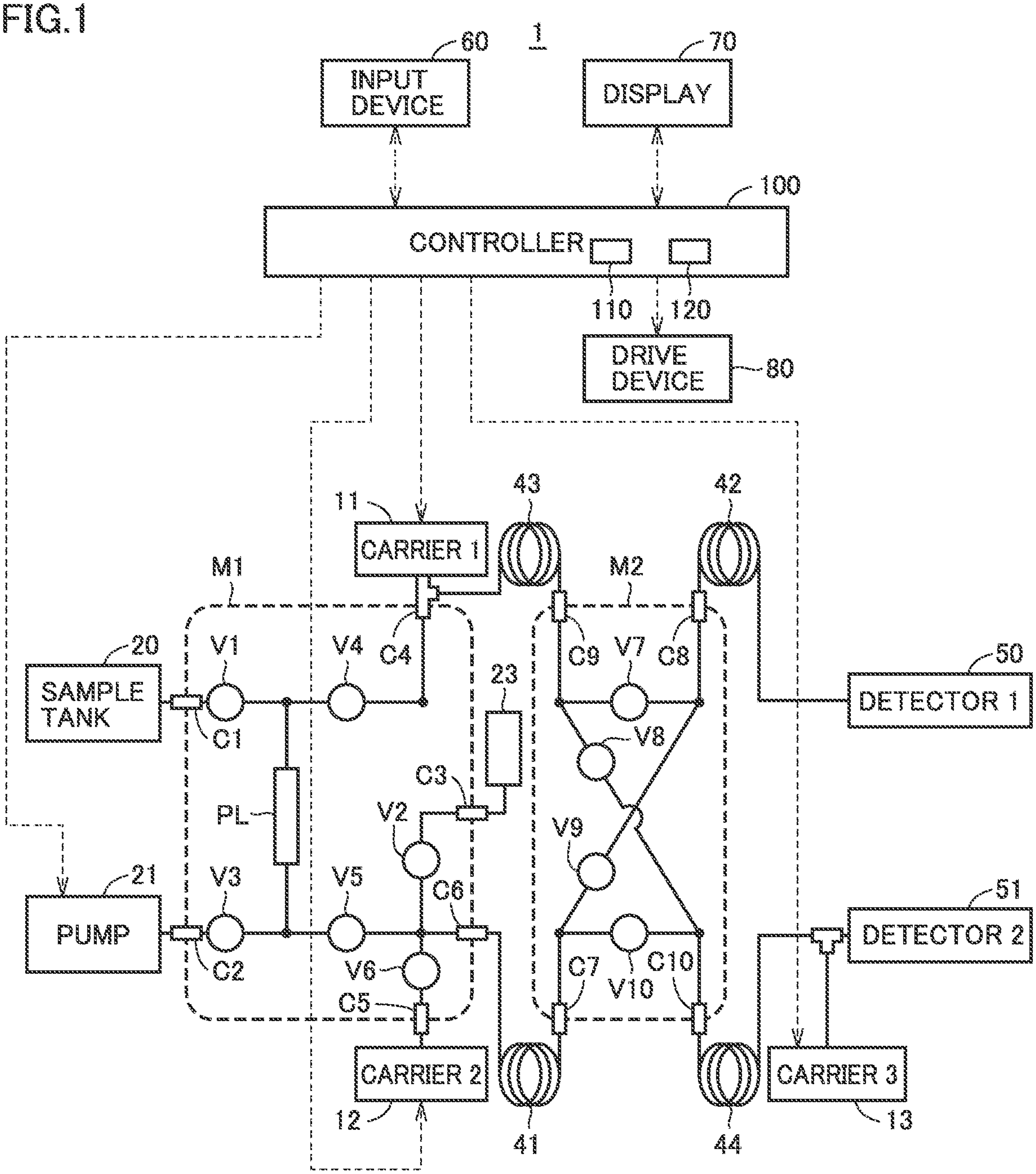
FIG. 1 is a diagram (No. 1) schematically showing an exemplary configuration of a gas analysis system.

The present embodiment will be described in detail below with reference to the drawings. The same or corresponding elements in the drawings below have the same reference characters allotted and description thereof will not be repeated.

[Overall Configuration of System]

FIG. 1 is a diagram schematically showing an exemplary configuration of a gas analysis system 1 according to the present embodiment.

Gas analysis system 1 includes carrier gas supply devices 11 to 13, a sample tank 20, a pump 21, a vent 23, a sampler module M1, a switching module M2, columns 41 to 44, detectors 50 and 51, an input device 60, a display 70, a drive device 80, and a controller 100.

Each of carrier gas supply devices 11 to 13 regulates a mobile phase called carrier gas to a predetermined pressure and outputs the mobile phase. For example, helium gas is used as carrier gas. The pressure of carrier gas is regulated by a not-shown electronic automatic pressure controller (APC).

Sample tank 20 is an apparatus where sample gas to be analyzed is stored. Sample tank 20 is connected to a connector C1 of sampler module M1. Connector C1 functions as an inflow portion to which sample gas from sample tank 20 is inputted. Therefore, connector C1 will also be referred to as an "inflow portion C1" below. A user can change sample gas to be analyzed by gas analysis system 1 by replacing sample tank 20 connected to connector C1 of sampler module M1.

Pump 21 is a suction pump that suctions air in a flow channel in sampler module M1 to set a pressure in the flow channel in sampler module M1 to a negative pressure. The negative pressure here means a pressure lower than the atmospheric pressure, with the atmospheric pressure being defined as the reference.

Vent 23 allows communication of the flow channel in sampler module M1 to the outside to emit gas in the flow channel in sampler module M1 to the outside.

Sampler module M1 and switching module M2 are provided on a flow channel that is fluidly connected to sample tank 20, columns 41 to 44, and detectors 50 and 51. Fluid connection here means direct connection by fluid without another component being interposed or indirect connection by fluid with another component being interposed.

Each of sampler module M1 and switching module M2 is formed by mount of a plurality of switching valves on a flow channel plate (flow channel member) where a flow channel pattern is formed.

Each of modules M1 and M2 is provided with a plurality of connectors (interfaces) for connection of an external device. A flow channel provided in each of modules M1 and M2 is connected to the external device through these connectors. Specifically, sampler module M1 is provided with connectors C1 to C6. Sample tank 20, pump 21, and vent 23 are connected to connectors C1 to C3, respectively. Carrier gas supply device 11 and column 43 are connected to connector C4. Carrier gas supply device 12 is connected to connector C5. Column 41 is connected to connector C6. Switching module M2 is provided with connectors C7 to C10. Columns 41 to 44 are connected to connectors C7 to C10, respectively.

Sampler module M1 is a device for dispensing a constant amount of sample gas to column 41. Sampler module M1 includes connectors C1 to C6, a sample loop PL of a constant volume, switching valves V1 to V6, and a plurality of flow channels that connect these members. Sample tank 20, pump 21, vent 23, carrier gas supply device 11, carrier gas supply device 12, and column 41 are connected to connectors C1 to C6 of sampler module M1, respectively, as described above.

Switching valves V1 and V4 are arranged in this order in the flow channel from connector C1 to connector C4. Switching valves V3, V5, and V6 are arranged in this order in the flow channel from connector C2 to connector C5. Switching valve V2 is arranged in the flow channel that connects the flow channel between switching valves V5 and V6 and connector C3 to each other.

Sample loop PL is arranged in the flow channel that connects the flow channel between switching valves V1 and V4 and the flow channel between switching valves V3 and V5 to each other. Sample loop PL performs a function to temporarily hold sample gas introduced from sample tank 20 for supply to column 41. As a connection target of sample loop PL is switched as appropriate by control of switching valves V1 to V6, sampler module M1 once allows sample loop PL to be filled with sample gas supplied from sample tank 20 and thereafter allows supply of sample gas filled in sample loop PL to column 41.

Switching module M2 includes connectors C7 to C10, switching valves V7 to V10, and a plurality of flow channels that connect these members. Columns 41 to 44 are connected to connectors C7 to C10 of switching module M2, respectively, as described above.

Switching valve V9 is arranged in the flow channel between connector C7 and connector C8. Switching valve V8 is arranged in the flow channel between connector C9 and connector C10.

Switching valve V7 is arranged in the flow channel that connects the flow channel between connector C9 and switching valve V8 and the flow channel between connector C8 and switching valve V9 to each other. Switching valve V10 is arranged in the flow channel that connects the flow channel between connector C7 and switching valve V9 and the flow channel between connector C10 and switching valve V8 to each other.

Switching valves V1 to V10 are switched to either an open state or a closed state by drive device 80. Drive device 80 switches the state of switching valves V1 to V10 in accordance with a command from controller 100. In other words, the state of switching valves V1 to V10 is controlled by controller 100.

Columns 41 and 42 each separate various components in supplied sample gas. Specifically, columns 41 and 42 each separate various components contained in sample gas in a temporal direction while supplied sample gas passes through each column over a flow of carrier gas and output the components. Column 41 is a column for primary separation. Column 42 is a column for secondary separation for further separation of the various components in sample gas primarily separated in column 41. Columns 43 and 44 are each a resistance tube for pressure regulation that is not capable of separating (holding) various components in sample gas.

Detector 50 is connected to column 42 and detects various components introduced from column 42. Detector 51 is connected to column 44 and detects various components introduced from column 44. For example, an absorbance detector (photo diode array (PDA) detector), a fluorescence detector, a differential refractometer, a conductivity detector, or a mass spectrometer is employed as each of detectors 50 and 51. Data indicating a result of detection by each of detectors 50 and 51 is stored in a storage 120 in controller 100 and shown on display 70 in response to a request from a user.

Input device 60 is implemented, for example, by a keyboard or a pointing device such as a mouse, and receives a request or a command from the user. The request or the command from the user inputted to input device 60 is sent to controller 100.

Display 70 is implemented, for example, by a liquid crystal display (LCD) panel, and shows information to the user. When a touch panel is employed as a user interface, input device 60 and display 70 are integrally formed.

Controller 100 includes a processor (output unit) 110, storage 120, an input and output interface, and the like. Controller 100 controls in an integrated manner, the entire gas analysis system 1 including carrier gas supply devices 11 to 13, pump 21, and switching valves V1 to V10 (drive device 80). Controller 100 is connected through a wire or wirelessly, to input device 60 and display 70 which are the user interfaces.

Processor (output unit) 110 includes a computing unit (central processing unit), generates control signals for control of switching valves V1 to V10 based on information stored in storage 120, and outputs the generated control signals to switching valves V1 to V10 (drive device 80) through the output interface.

[Construction of Switching Valves V1 to V10]

An exemplary construction of switching valves V1 to V10 according to the present embodiment will be described with reference to FIGS. 2 and 3. Since switching valves V1 to V10 are identical in basic construction, in FIGS. 2 and 3, switching valves V1 to V10 will be described as a microvalve 200, without being distinguished from one another.

Figure 2:
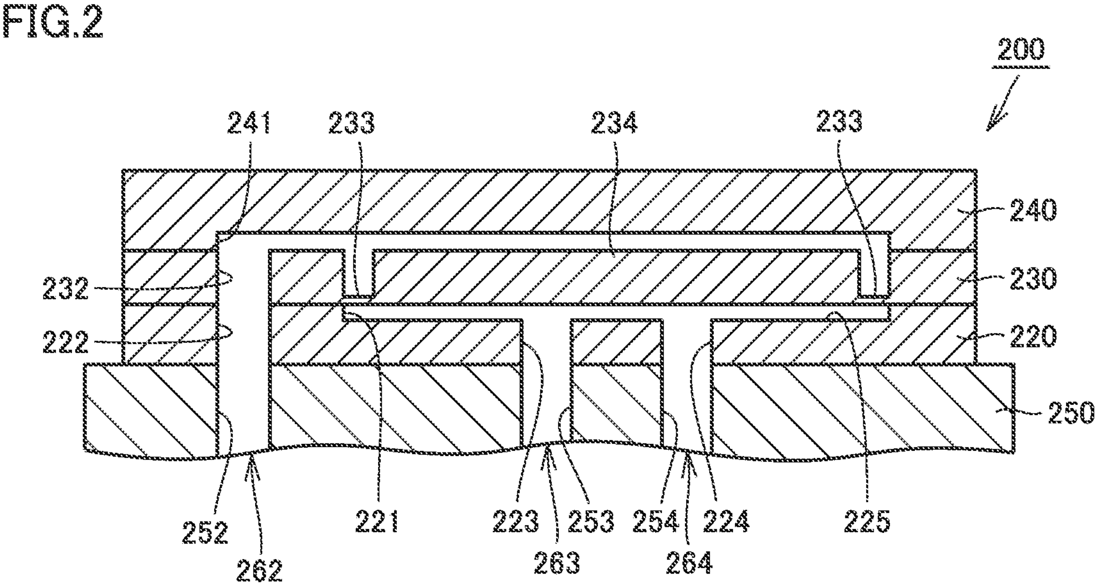
FIG. 2 is a cross-sectional view (No. 1) of a microvalve.
Figure 3:
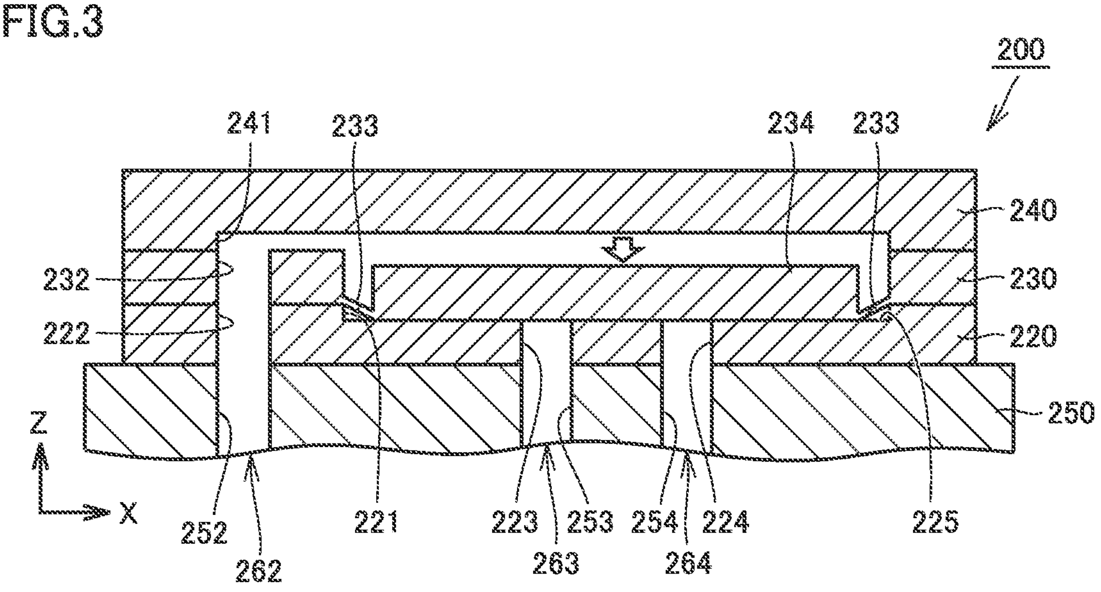
FIG. 3 is a cross-sectional view (No. 2) of the microvalve.

FIG. 2 is a cross-sectional view of microvalve 200 while microvalve 200 is open. FIG. 3 is a cross-sectional view of microvalve 200 while microvalve 200 is closed.

Microvalve 200 includes a base layer 220, a diaphragm layer 230, and a cover layer 240, and is in a layered structure in which these are layered in this order. Each of base layer 220, diaphragm layer 230, and cover layer 240 is formed, for example, of silicon to achieve desired strength and flexibility, and micromachined based on the micro electric mechanical systems (MEMS) technology.

Microvalve 200 has a thickness (a dimension in a direction of layering) approximately from 1 to 2 mm. Description may be given below, with a direction from base layer 220 toward cover layer 240 being defined as an upward direction and with a direction from cover layer 240 toward base layer 220 being defined as a downward direction, for the sake of convenience.

Base layer 220 is arranged as a lowermost layer of microvalve 200. Base layer 220 is provided with a recess 221 and openings 222 to 224 that pass through base layer 220. Recess 221 is in a substantially circular shape when base layer 220 is two-dimensionally viewed from above, and it is provided around substantially the center of base layer 220. Recess 221 is recessed from an upper surface side toward a lower surface side of base layer 220. Base layer 220 has a thickness of approximately 150 μm. Recess 221 has a depth from 5 to 20 μm, and preferably has a depth of approximately 10 μm.

Openings 223 and 224 are provided in a bottom 225 of recess 221. As will be described later, openings 223 and 224 define a flow inlet and a flow outlet of sample gas. Opening 222 is provided at a distance from recess 221, at an outer edge around recess 221 of base layer 220. Opening 222 defines a port of supply of fluid (pneumatic fluid) for control of microvalve 200.

Diaphragm layer 230 is arranged as being opposed to base layer 220 on the upper surface side of base layer 220. Diaphragm layer 230 includes an opening 232 that passes through diaphragm layer 230, a rigid portion 234, and a flexible portion 233 provided around rigid portion 234. Flexible portion 233 is smaller in thickness than rigid portion 234 and flexible. With elastic deformation of flexible portion 233, rigid portion 234 is displaced in an upward-downward direction.

Opening 232 is provided at a distance from flexible portion 233 and rigid portion 234. Opening 232 is provided at a position superimposed on opening 222 in base layer 220 when viewed two-dimensionally from above, and it defines, together with opening 222, the port of supply of pneumatic fluid.

Microvalve 200 is used as being connected to a flow channel member (flow channel plate) 250. Flow channel member 250 is provided with openings 252 to 254 at positions corresponding to respective openings 222 to 224 in base layer 220. Opening 252 in flow channel member 250, opening 222 in base layer 220, and opening 232 in diaphragm layer 230 communicate with one another to define a pneumatic fluid supply port 262. Pneumatic fluid is supplied to a recess 241 in cover layer 240 through supply port 262.

Opening 253 in flow channel member 250 communicates with opening 223 in base layer 220 to define a sample gas flow inlet 263. Opening 254 in flow channel member 250 communicates with opening 224 in base layer 220 to define a sample gas flow outlet 264.

Microvalve 200 is what is called a normally open valve which is open in an initial state (normal state) in which pneumatic fluid is not supplied to supply port 262 of flow channel member 250 and closed by supply of pneumatic fluid to supply port 262 of flow channel member 250.

While pneumatic fluid is not supplied to supply port 262 of flow channel member 250, as shown in FIG. 2, rigid portion 234 is held at a distance from bottom 225 of recess 221 in base layer 220. Therefore, an open state in which flow inlet 263 and flow outlet 264 of sample gas communicate with each other is set.

When pneumatic fluid is supplied to supply port 262 of flow channel member 250, rigid portion 234 is displaced downward by being pressed by pneumatic fluid. A lower surface of rigid portion 234 thus comes in intimate contact with bottom 225 of recess 221 in base layer 220 and a closed state in which sample gas flow inlet 263 and sample gas flow outlet 264 are disconnected from each other is set. Instead of drive (displacement) of rigid portion 234 with pneumatic fluid, rigid portion 234 may electrically be driven (displaced) by a piezoelectric element or the like.

[Each Function and Operation of System]

Gas analysis system 1 can achieve five basic functions of sampling, pre-cut, heart-cut, column switching, and back flash without change of a hardware configuration of sampler module M1 and switching module M2 based on combination of an open state and a closed state of switching valves V1 to V10. Each function and an operation of gas analysis system 1 will be described below.

(Function 1) Sampling Function

A sampling function is a function to sample a constant amount of sample gas. While the sampling function is performed, three patterns of a sampling pattern P11, a pressure equilibrium pattern P12, and an injection pattern P13 make transition in this order.

Figure 4:
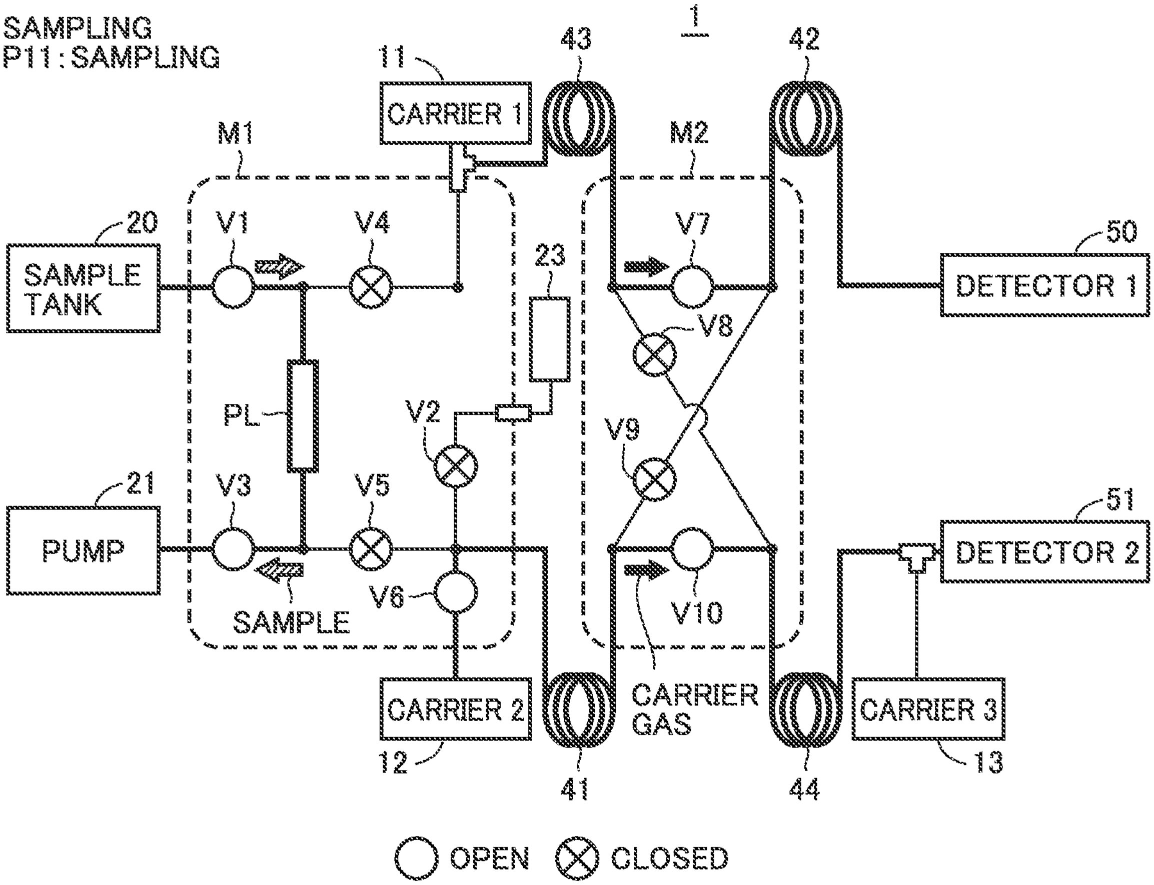
FIG. 4 is a diagram (No. 1) showing a state of switching valves and a flow of each gas.

FIG. 4 is a diagram showing a state of switching valves V1 to V10 and a flow of each gas in sampling pattern P11. In FIG. 4, a switching valve labeled with a cross mark is closed and a switching valve not labeled with a cross mark is open. In FIG. 4, a solid arrow indicates a flow of carrier gas and a hatched arrow indicates a flow of sample gas (sample). This is also applicable to FIGS. 5 to 13 that follow.

As shown in FIG. 4, in sampling pattern P11, switching valves V1, V3, V6, V7, and V10 are open and other switching valves V2, V4, V5, V8, and V9 are closed. In addition, pump 21 is activated. Thus, as shown with the hatched arrow, sample loop PL is filled with sample gas from sample tank 20.

In sampling pattern P11, carrier gas supply devices 11 and 12 are activated and carrier gas supply device 13 is deactivated.

Thus, as shown with the solid arrow, carrier gas from carrier gas supply device 11 is supplied to detector 50 through columns 43 and 42 and carrier gas from carrier gas supply device 12 is supplied to detector 51 through columns 41 and 44. Thereafter, the operation pattern of gas analysis system 1 is switched from sampling pattern P11 to pressure equilibrium pattern P12.

Figure 5:
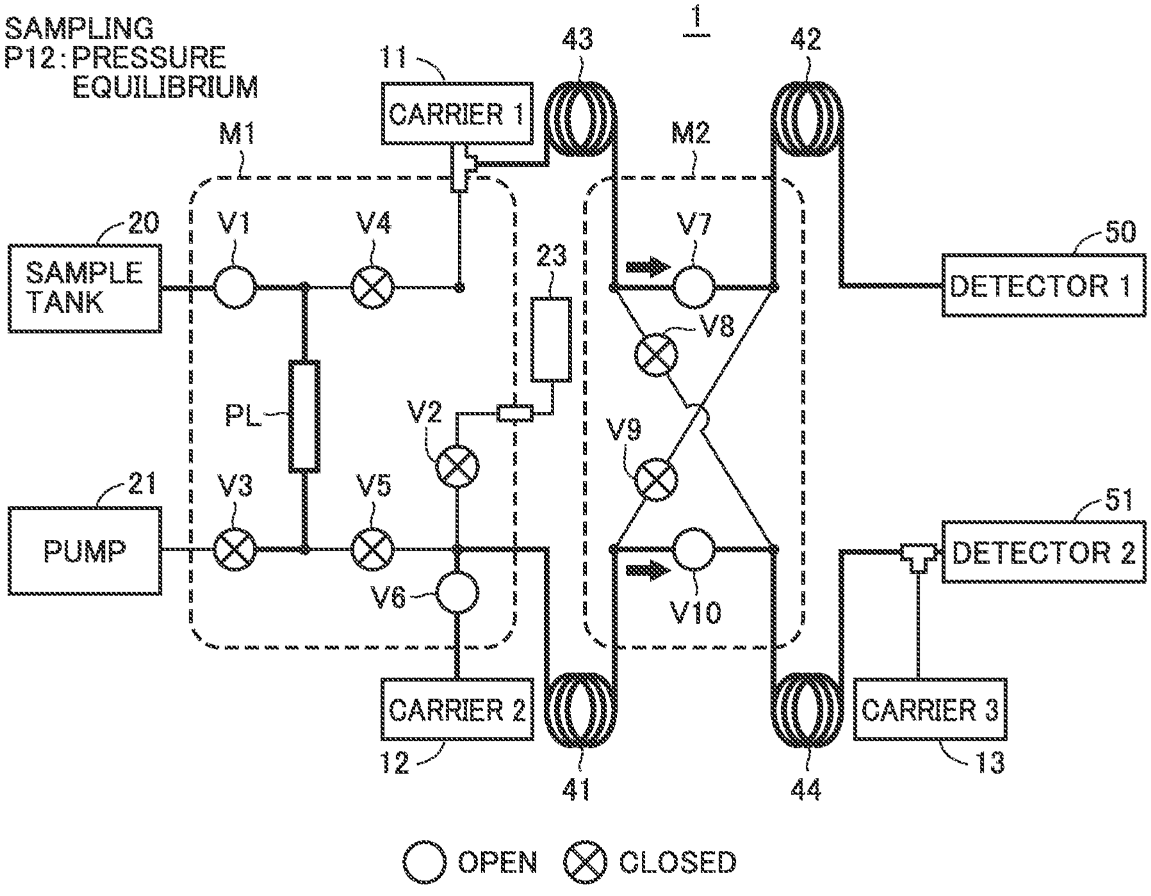
FIG. 5 is a diagram (No. 2) showing a state of switching valves and a flow of each gas.

FIG. 5 is a diagram showing a state of switching valves V1 to V10 and a flow of each gas in pressure equilibrium pattern P12. As shown in FIG. 5, in pressure equilibrium pattern P12, switching valves V1, V6, V7, and V10 are open and other switching valves V2 to V5, V8, and V9 are closed. In addition, carrier gas supply devices 11 and 12 are activated and carrier gas supply device 13 and pump 21 are deactivated.

An equilibrium state in which the pressure in sample loop PL is stable substantially at the atmospheric pressure is thus set. An amount of sample gas held in sample loop PL can thus be stabilized at a constant amount. Thereafter, the operation pattern of gas analysis system 1 is switched from pressure equilibrium pattern P12 to injection pattern P13.

Figure 6:
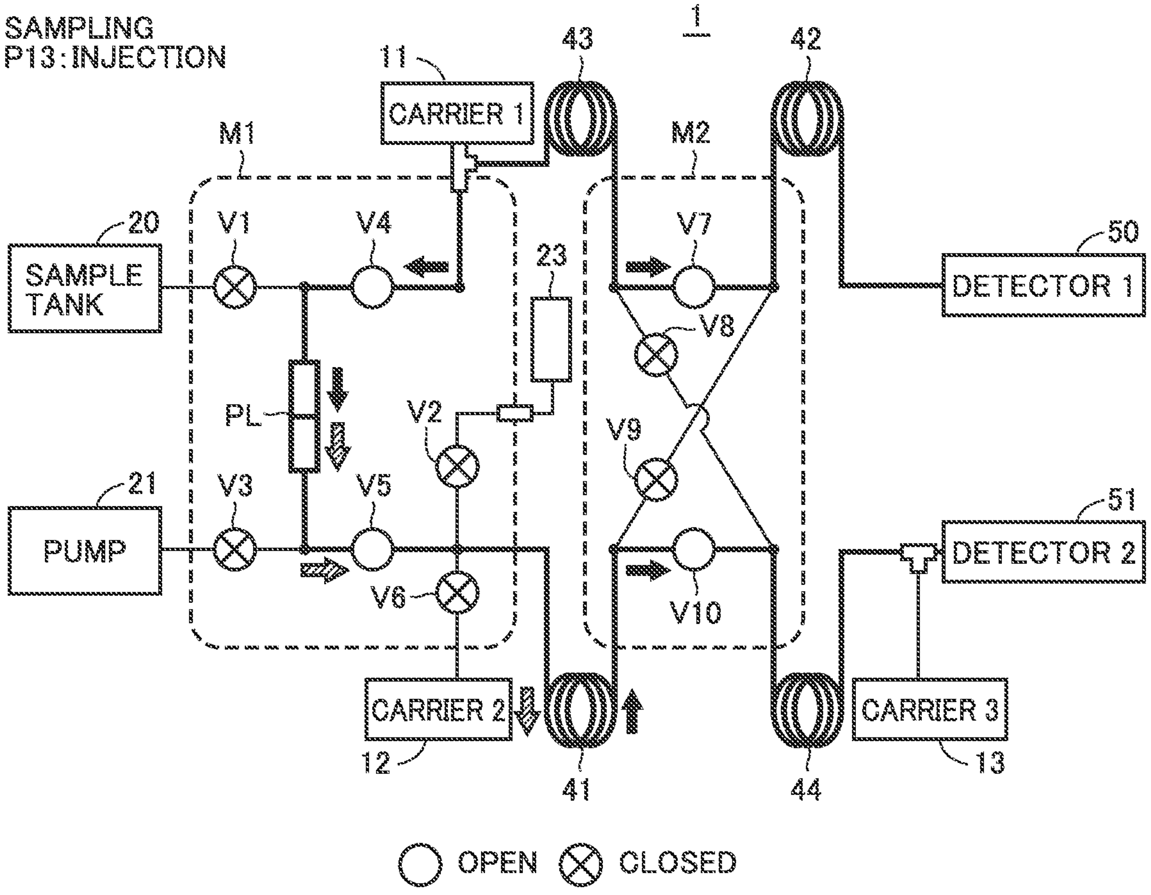
FIG. 6 is a diagram (No. 3) showing a state of switching valves and a flow of each gas.

FIG. 6 is a diagram showing a state of switching valves V1 to V10 and a flow of each gas in injection pattern P13. As shown in FIG. 6, in injection pattern P13, switching valves V4, V5, V7, and V10 are open and other switching valves V1 to V3, V6, V8, and V9 are closed. In addition, carrier gas supply devices 11 and 12 are activated and carrier gas supply device 13 and pump 21 are deactivated.

Carrier gas from carrier gas supply device 11 is thus supplied to sample loop PL through switching valve V4 and sample gas filled in sample loop PL is pushed out by carrier gas and supplied to column 41 through switching valve V5.

(Function 2) Pre-Cut Function

The pre-cut function is a function to analyze only a component that is eluted early among components contained in sample gas supplied to column 41 and to emit a component later in elution to the outside of an analysis system. The pre-cut function is performed after the sampling function is performed. While the pre-cut function is performed, three patterns of a pre-separation pattern P21, a secondary separation pattern P22, and a pre-cut pattern P23 make transition in this order.

Figure 7:
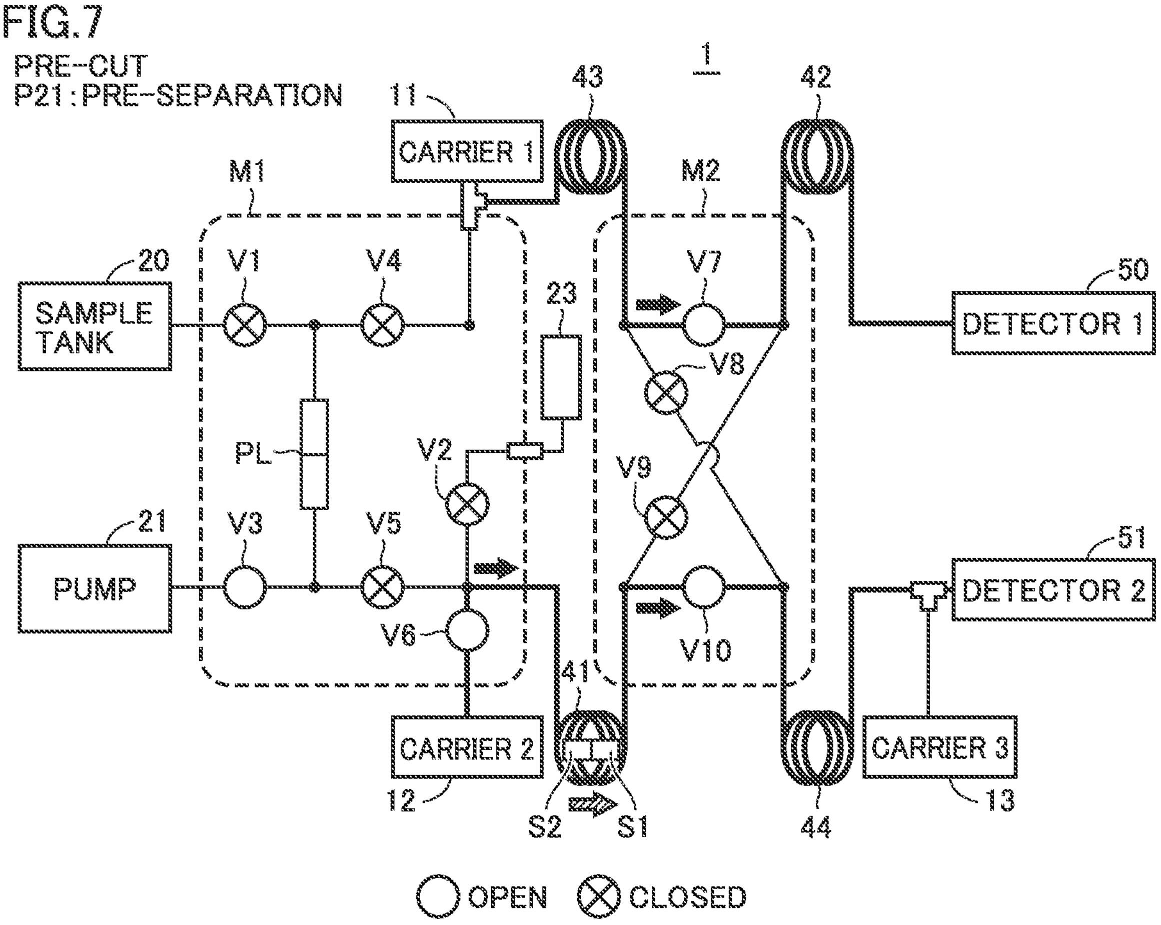
FIG. 7 is a diagram (No. 4) showing a state of switching valves and a flow of each gas.

FIG. 7 is a diagram showing a state of switching valves V1 to V10 and a flow of each gas in pre-separation pattern P21. As shown in FIG. 7, in pre-separation pattern P21, switching valves V3, V6, V7, and V10 are open and other switching valves V1, V2, V4, V5, V8, and V9 are closed. In addition, carrier gas supply devices 11 and 12 are activated and carrier gas supply device 13 and pump 21 are deactivated.

Thus, in column 41, separation into a target component S1 that is eluted early and a non-target component S2 later in elution is made. Thereafter, the operation pattern of gas analysis system 1 is switched from pre-separation pattern P21 to secondary separation pattern P22.

Figure 8:
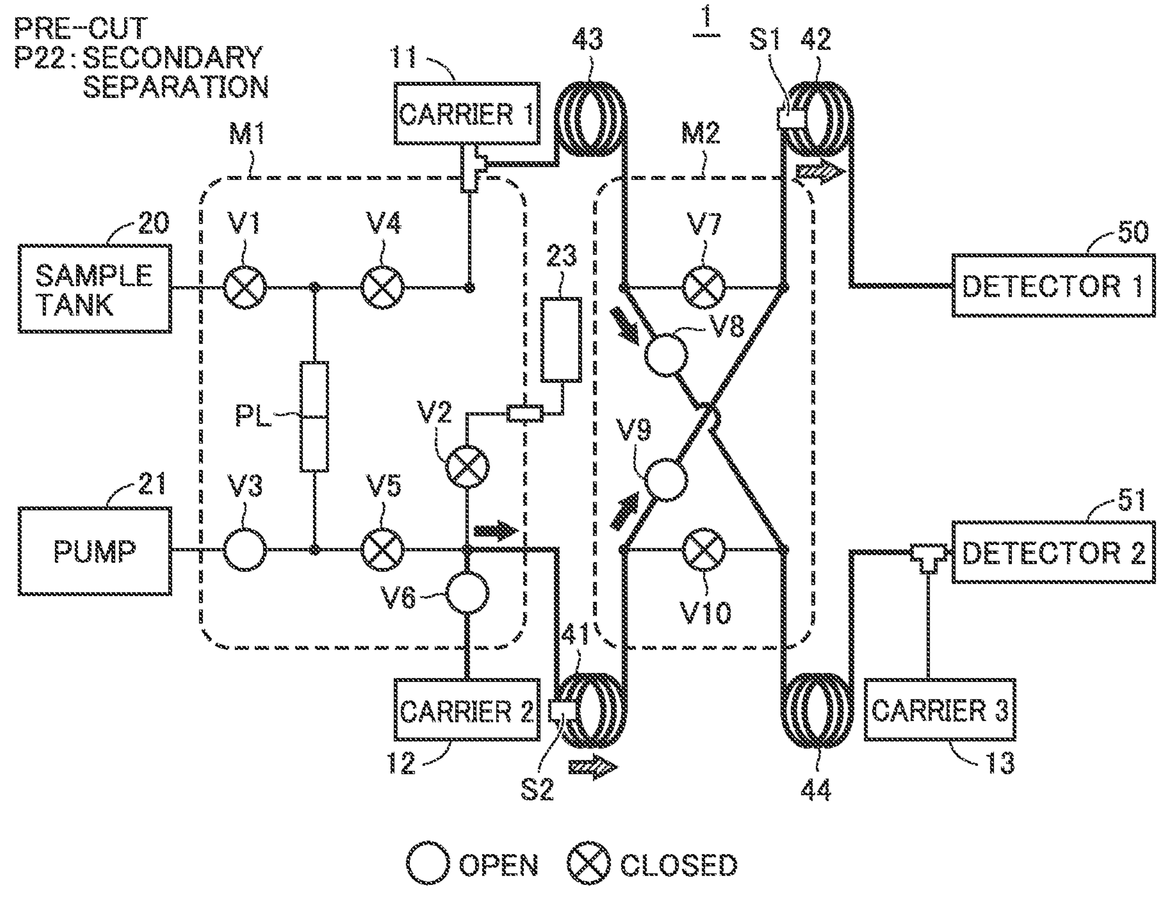
FIG. 8 is a diagram (No. 5) showing a state of switching valves and a flow of each gas.

FIG. 8 is a diagram showing a state of switching valves V1 to V10 and a flow of each gas in secondary separation pattern P22. As shown in FIG. 8, in secondary separation pattern P22, switching valves V3, V6, V8, and V9 are open and other switching valves V1, V2, V4, V5, V7, V10 are closed. In addition, carrier gas supply devices 11 and 12 are activated and carrier gas supply device 13 and pump 21 are deactivated.

Target component S1 is thus supplied from column 41 through switching valve V9 to column 42, where it is secondarily separated. Target component S1 secondarily separated in column 42 is supplied to detector 50 and detected by the same. After target component S1 is supplied to column 42, the operation pattern of gas analysis system 1 is switched from secondary separation pattern P22 to pre-cut pattern P23.

Figure 9:
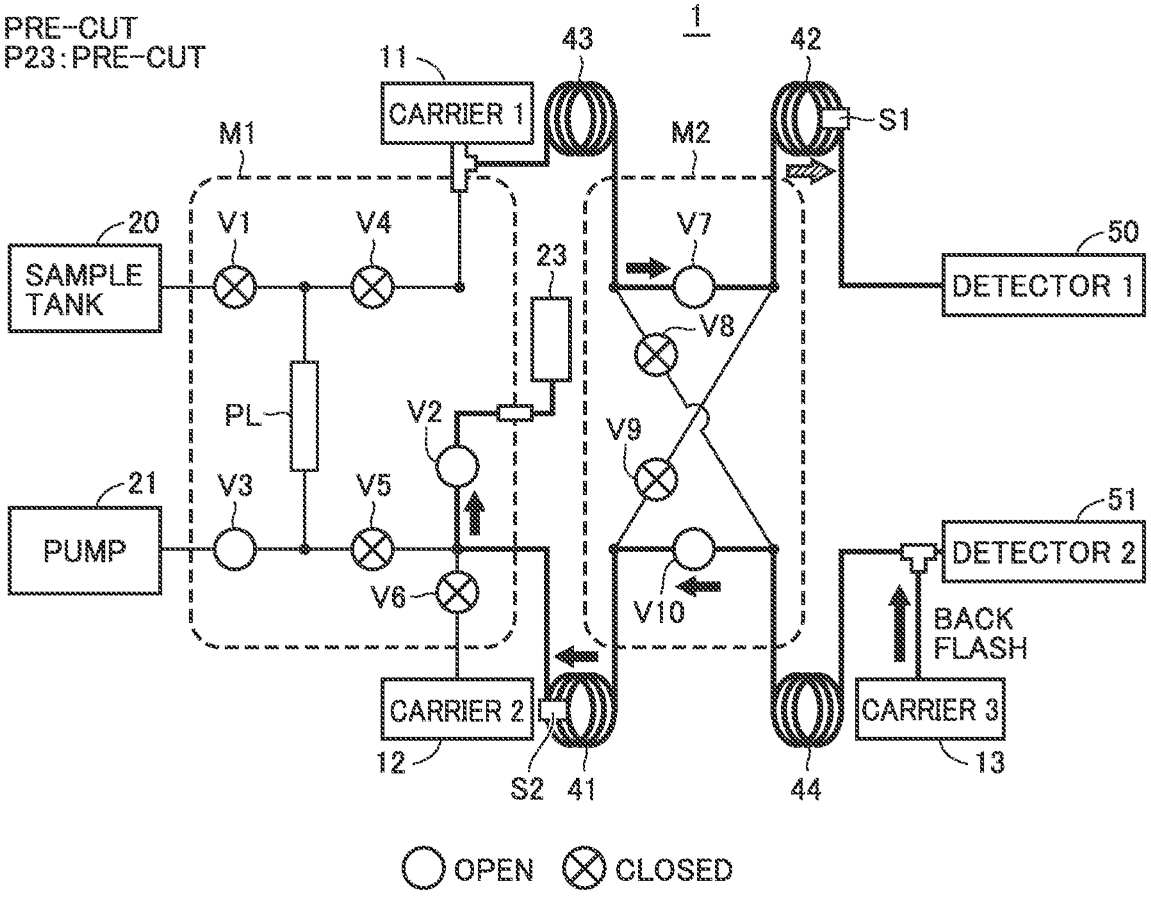
FIG. 9 is a diagram (No. 6) showing a state of switching valves and a flow of each gas.

FIG. 9 is a diagram showing a state of switching valves V1 to V10 and a flow of each gas in pre-cut pattern P23. As shown in FIG. 9, in pre-cut pattern P23, switching valves V2, V3, V7, and V10 are open and other switching valves V1, V4 to V6, V8, and V9 are closed. In addition, carrier gas supply devices 11 and 13 are activated and carrier gas supply device 12 and pump 21 are deactivated.

Carrier gas from carrier gas supply device 13 thus passes through switching valve V10 and flows back in column 41, and non-target component S2 that remains in column 41 is pushed back by carrier gas and emitted to the outside from vent 23 through switching valve V2.

(Function 3) Heart-Cut Function

The heart-cut function is a function to make separation into a component separated in primary separation by column 41 and a component that cannot fully be separated in primary separation, and to supply the component that cannot fully be separated in primary separation to column 42 for secondary separation. The heart-cut function is performed after the sampling function is performed. The user can select the function to be performed after the sampling function, between the pre-cut function and the heart-cut function. While the heart-cut function is performed, three patterns of a frontal component detection pattern P31, a secondary separation pattern (heart-cut pattern) P32, and a rear component detection pattern P33 make transition in this order.

Figure 10:
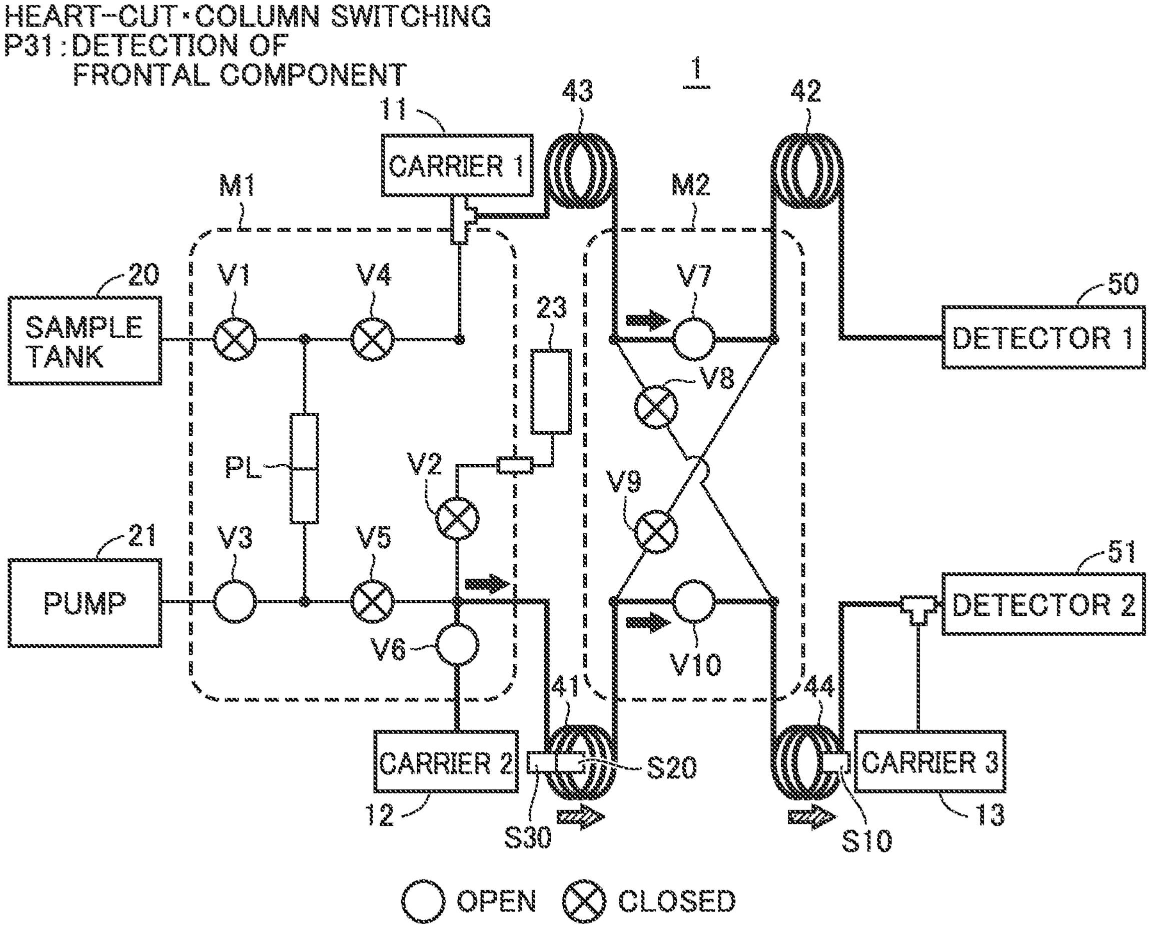
FIG. 10 is a diagram (No. 7) showing a state of switching valves and a flow of each gas.

FIG. 10 is a diagram showing a state of switching valves V1 to V10 and a flow of each gas in frontal component detection pattern P31. As shown in FIG. 10, in frontal component detection pattern P31, switching valves V3, V6, V7, and V10 are open and other switching valves V1, V2, V4, V5, V8, and V9 are closed. In addition, carrier gas supply devices 11 and 12 are activated and carrier gas supply device 13 and pump 21 are deactivated.

Thus, in column 41, separation into a frontal component S10 that is eluted early, a cut component S20 that is eluted following frontal component S10, and a rear component S30 later in elution than cut component S20 is made. Frontal component S10 and rear component S30 are components separated in primary separation by column 41. Cut component S20 is a component that cannot fully be separated in primary separation.

Frontal component S10 is supplied through switching valve V10 and column 44 to detector 51. Detector 51 thus detects frontal component S10. After frontal component S10 is supplied to column 42, the operation pattern of gas analysis system 1 is switched from frontal component detection pattern P31 to secondary separation pattern P32.

Figure 11:
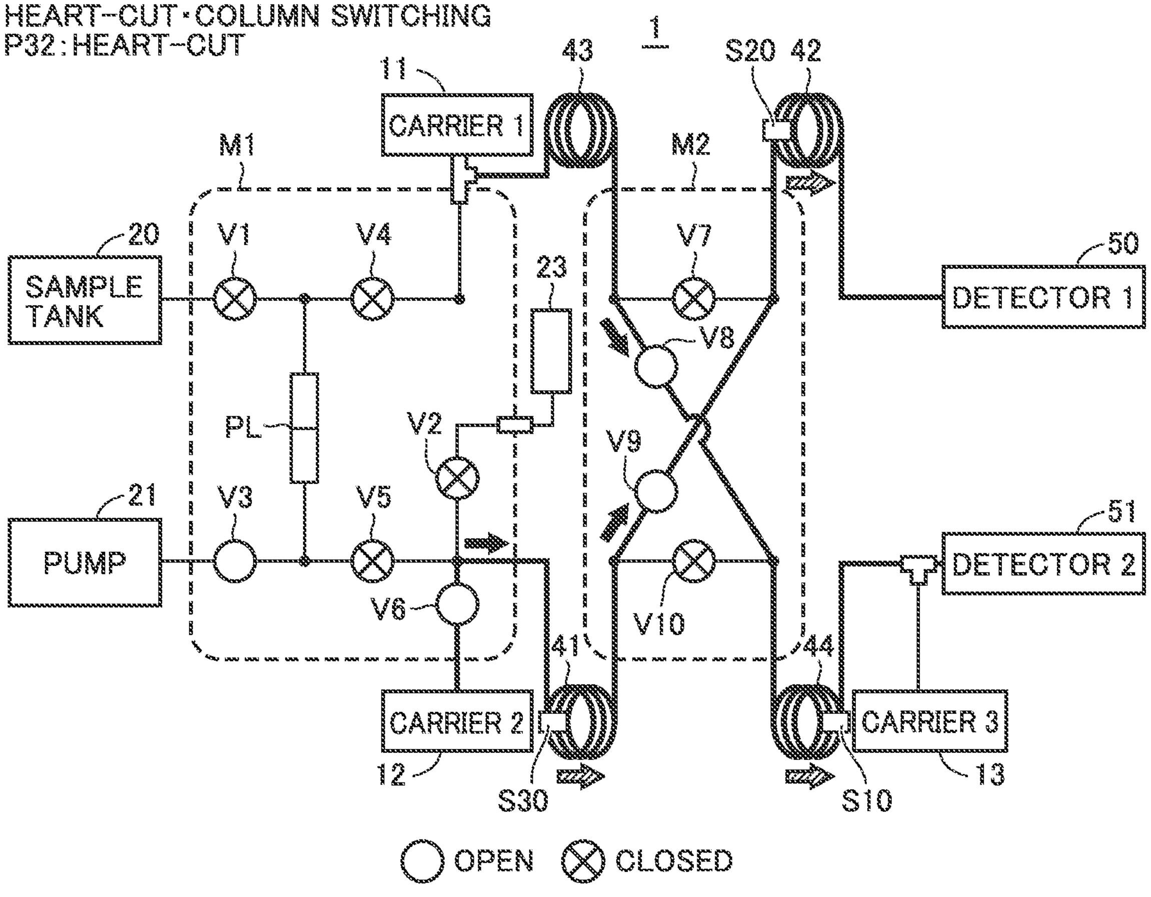
FIG. 11 is a diagram (No. 8) showing a state of switching valves and a flow of each gas.

FIG. 11 is a diagram showing a state of switching valves V1 to V10 and a flow of each gas in secondary separation pattern P32. As shown in FIG. 11, in secondary separation pattern P32, switching valves V3, V6, V8, and V9 are open and other switching valves V1, V2, V4, V5, V7, and V10 are closed. In addition, carrier gas supply devices 11 and 12 are activated and carrier gas supply device 13 and pump 21 are deactivated.

Thus, cut component S20 is supplied from column 41 through switching valve V9 to column 42, secondarily separated by column 42, and thereafter supplied to detector 50. Detector 50 thus detects cut component S20. After cut component S20 is supplied to column 42, the operation pattern of gas analysis system 1 is switched from secondary separation pattern P32 to rear component detection pattern P33.

Figure 12:
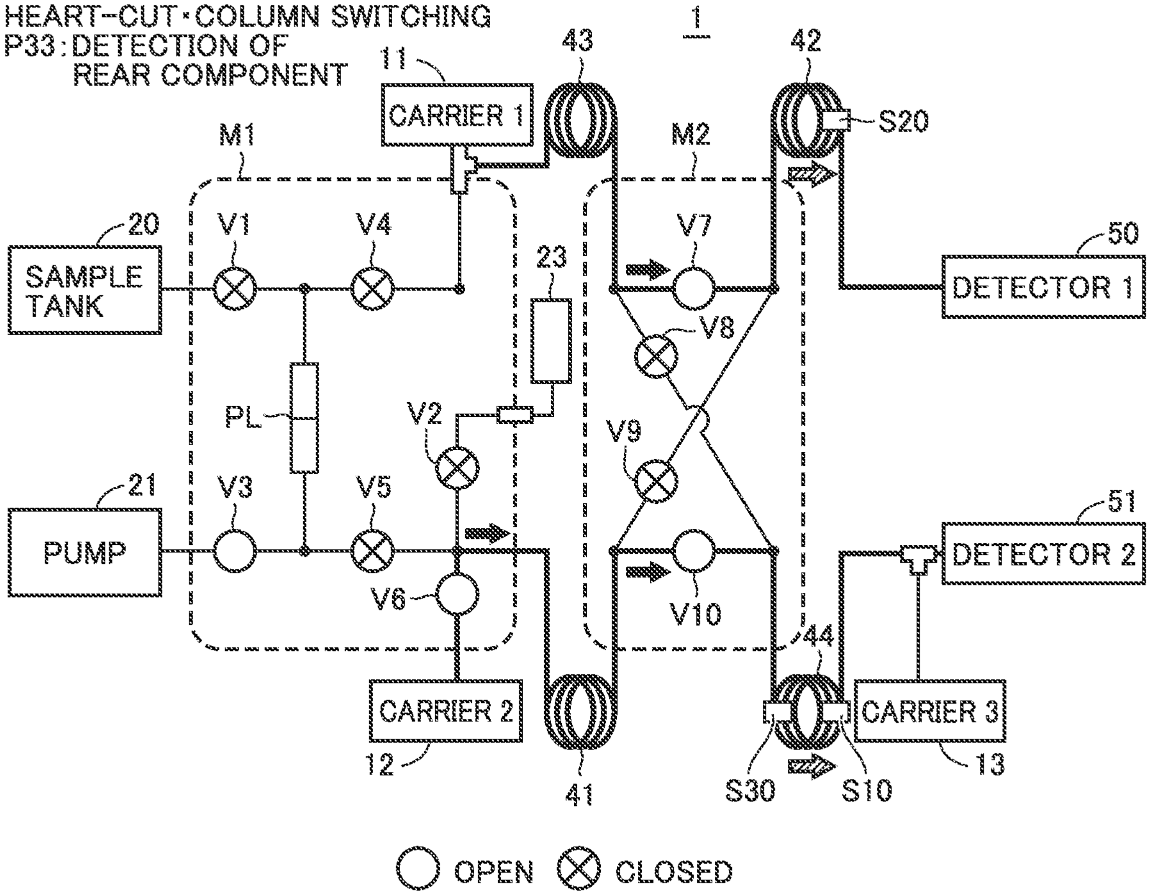
FIG. 12 is a diagram (No. 9) showing a state of switching valves and a flow of each gas.

FIG. 12 is a diagram showing a state of switching valves V1 to V10 and a flow of each gas in rear component detection pattern P33. As shown in FIG. 12, in rear component detection pattern P33, switching valves V3, V6, V7, and V10 are open and other switching valves V1, V2, V4, V5, V8, and V9 are closed. In addition, carrier gas supply devices 11 and 12 are activated and carrier gas supply device 13 and pump 21 are deactivated.

Rear component S30 is thus supplied through switching valve V10 and column 44 to detector 51. Detector 51 thus detects rear component S30.

(Function 4) Column Switching Function

The column switching function is a function to switch the column in accordance with a component of interest in one analysis. In the column switching function, column 44 incapable of holding various components in sample gas is changed to a column for separation and then operations as in the heart-cut function described above are performed.

The column switching function can be achieved simply by an easy operation to change the column to be connected to connector C10, without change of the flow channel configuration in the inside of sampler module M1 and switching module M2.

(Function 5) Back Flash Function

The back flash function is a function to cause carrier gas to flow back to emit a component remaining in the column to the outside. While the back flash function is performed, the operation pattern of gas analysis system 1 is set to a back flash pattern P4.

Figure 13:
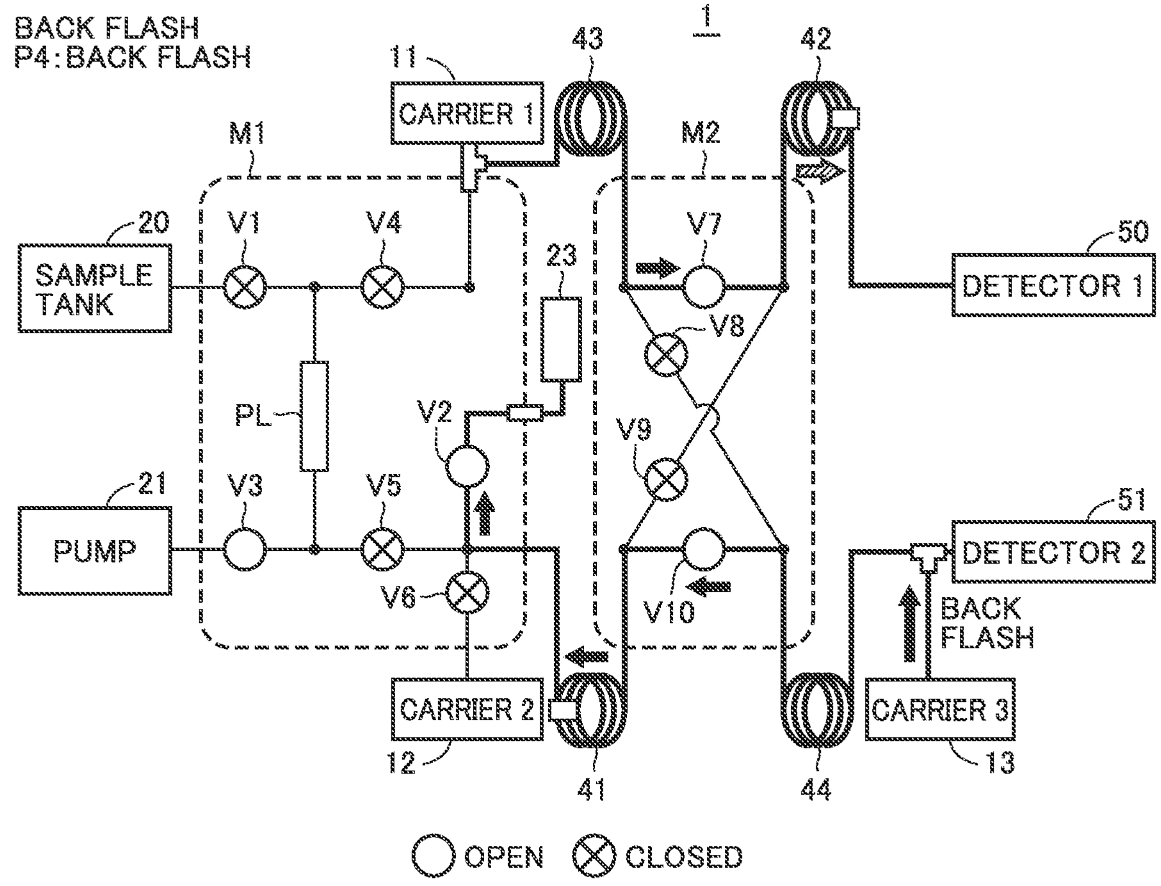
FIG. 13 is a diagram (No. 10) showing a state of switching valves and a flow of each gas.

FIG. 13 is a diagram showing a state of switching valves V1 to V10 and a flow of each gas in back flash pattern P4. As shown in FIG. 13, in back flash pattern P4, switching valves V2, V3, V7, and V10 are open and other switching valves V1, V4 to V6, V8, and V9 are closed. In addition, carrier gas supply devices 11 and 13 are activated and carrier gas supply device 12 and pump 21 are deactivated.

Carrier gas from carrier gas supply device 13 thus flows back in column 41, and the remaining component in column 41 is pushed back by carrier gas and emitted to the outside from vent 23 through switching valve V2.

[Control for Achieving Each Function]

FIG. 14 is a diagram of a list of patterns of open and closed states of switching valves V1 to V10 in the five basic functions (sampling, pre-cut, heart-cut, column switching, and back flash) described above.

Information that defines correspondence between each basic function and the open and closed states of switching valves V1 to V10 (which is also referred to as "function pattern information" below) as shown in FIG. 14 is stored in advance in storage 120 of controller 100.

Processor (output unit) 110 of controller 100 uses the function pattern information stored in storage 120 to generate control signals for control of the open and closed states of switching valves V1 to V10 and outputs the generated control signals to switching valves V1 to V10 (drive device 80). The five basic functions can thus be achieved without switching of the hardware configuration of sampler module M1 and switching module M2.

The user can select a function the user requests from among the five basic functions described above by performing an input operation onto input device 60, and designate a duration of the selected function. A state inputted to input device 60 by the user is sent from input device 60 to controller 100 as user request information.

FIG. 15 is a diagram showing exemplary user request information. FIG. 15 shows an example in which the user performs the sampling function and thereafter requests performance of the pre-cut function. As described above, while the sampling function is performed, the three patterns of sampling pattern P11, pressure equilibrium pattern P12, and injection pattern P13 make transition in this order, and while the pre-cut function is subsequently performed, the three patterns of pre-separation pattern P21, secondary separation pattern P22, and pre-cut pattern P23 make transition in this order. The user can designate the duration of each of these patterns.

When processor 110 receives input of the user request information as shown in FIG. 15 from input device 60, it arranges a control schedule in conformity with the user request information while referring to the function pattern information stored in storage 120, and controls opening and closing of switching valves V1 to V10 in conformity with the arranged schedule.

As set forth above, gas analysis system 1 according to the present embodiment includes columns 41 and 42 that separate a gas component contained in sample gas, detectors 50 and 51 that detect the gas component that flows out of columns 41 and 42, a flow channel (the flow channel in the inside of sampler module M1 and switching module M2) fluidly connected to columns 41 and 42 and detectors 50 and 51, switching valves V1 to V10 controllable independently of one another, and controller 100 that independently controls switching valves V1 to V10. Controller 100 includes storage 120 where the "function pattern information" defining correspondence between the plurality of basic functions different in purpose from one another and the opening and closing patterns of switching valves V1 to V10 is stored and processor (output unit) 110 that generates signals for controlling respective switching valves V1 to V10 based on the function pattern information stored in storage 120 and outputs the signals to switching valves V1 to V10.

Therefore, in gas analysis system 1 according to the present embodiment, the five basic functions can be achieved simply by changing by control, combination of the open and closed states of switching valves V1 to V10, without works for replacement of the hardware configuration of the flow channel (the flow channel in sampler module M1 and switching module M2).

Furthermore, in gas analysis system 1 according to the present embodiment, by input of a requested function requested by the user to input device 60, controller 100 specifies combination of the open and closed states of switching valves V1 to V10 corresponding to the requested function by referring to the "function pattern information" and automatically controls switching valves V1 to V10 to be in the specified open and closed state. Therefore, by simply inputting the function the user requests to input device 60, the user can conduct analysis with that function.

Furthermore, in gas analysis system 1 according to the present embodiment, since switching valves V1 to V10 are independently driven, the flow channel configuration as a whole as well as trouble shooting and maintenance on the occurrence of failure can be more simplified than in a conventional system including a rotary valve.

Specifically, the conventional system includes a rotary valve including a plurality of ports. Therefore, at the time of switching of the flow channel by turning of the valve, half the ports are simultaneously switched in coordination. Consequently, disadvantageously, the flow channel configuration has become complicated, and trouble shooting and maintenance on the occurrence of failure have also been difficult. In contrast, in gas analysis system 1 according to the present embodiment, switching valves V1 to V10 are independently controllable. Therefore, flow channel switching patterns can be various and the flow channel configuration as a whole can be simplified. On the occurrence of failure, a cause of the failure can be analyzed while switching valves V1 to V10 are independently driven to make switching to various flow channel patterns. Therefore, a location of the failure can easily be identified and trouble shooting and maintenance on the occurrence of failure can be simplified.

Furthermore, switching valves V1 to V10 according to the present embodiment are microvalves formed by micromachining based on the MEMS technology. Therefore, since a dead volume in the inside of the flow channel and each valve is very small, and pressure shock at the time of switching of the flow channel can be suppressed.

Specifically, the rotary valve included in the conventional system is large in internal volume and volume of a pipe and a portion of connection for connection of each port, and a large dead volume is caused at the time of switching of the flow channel. Therefore, pressure shock is likely at the time of switching of the flow channel. In addition, diffusion of the sample in the dead volume is likely, which may adversely affect a result of analysis. In contrast, since switching valves V1 to V10 according to the present embodiment are microvalves very small in dead volume, the conventional problems can be overcome.

First Modification

Figure 16:
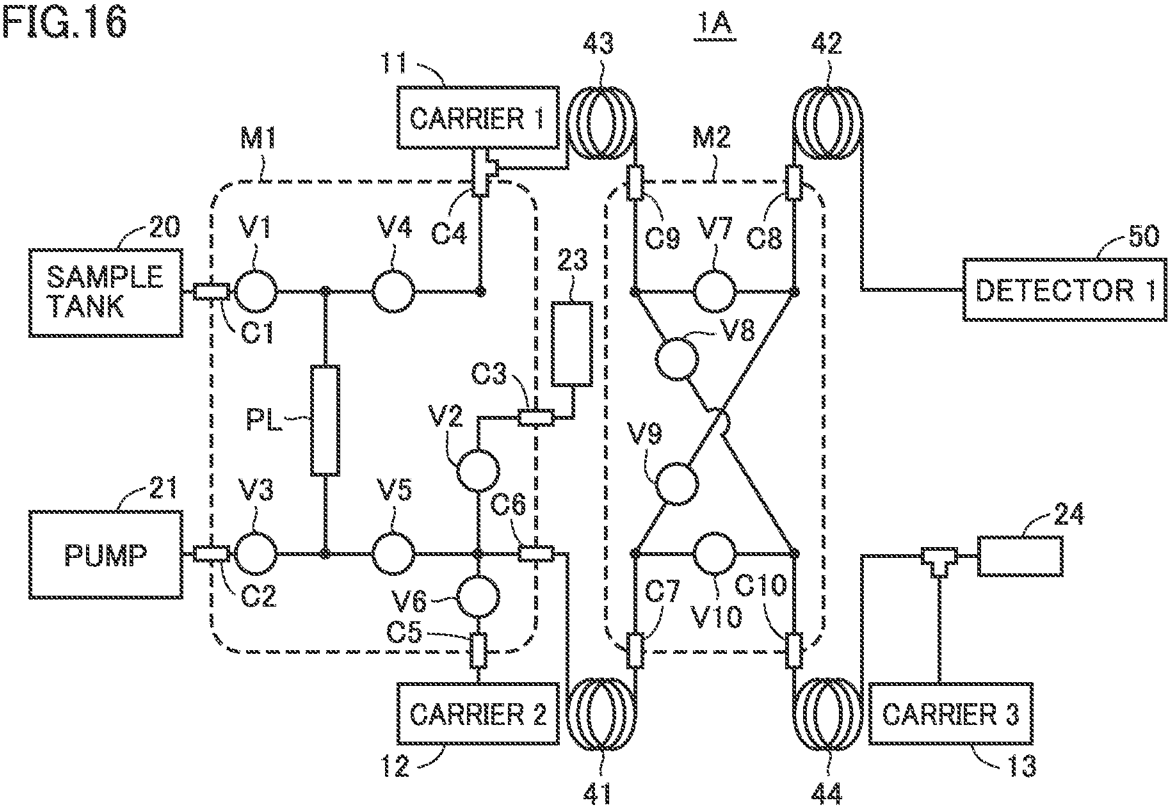
FIG. 16 is a diagram (No. 2) schematically showing an exemplary configuration of a gas analysis system.

FIG. 16 is a diagram schematically showing an exemplary configuration of a gas analysis system 1A according to the present first modification. Gas analysis system 1A includes a vent 24 in place of detector 51 in gas analysis system 1 described above. Gas analysis system 1A is otherwise the same in configuration as gas analysis system 1 described above. According to such a modification, a component that flows out of column 44 can directly be emitted from vent 24 to the outside of the analysis system.

Second Modification

Figure 17:
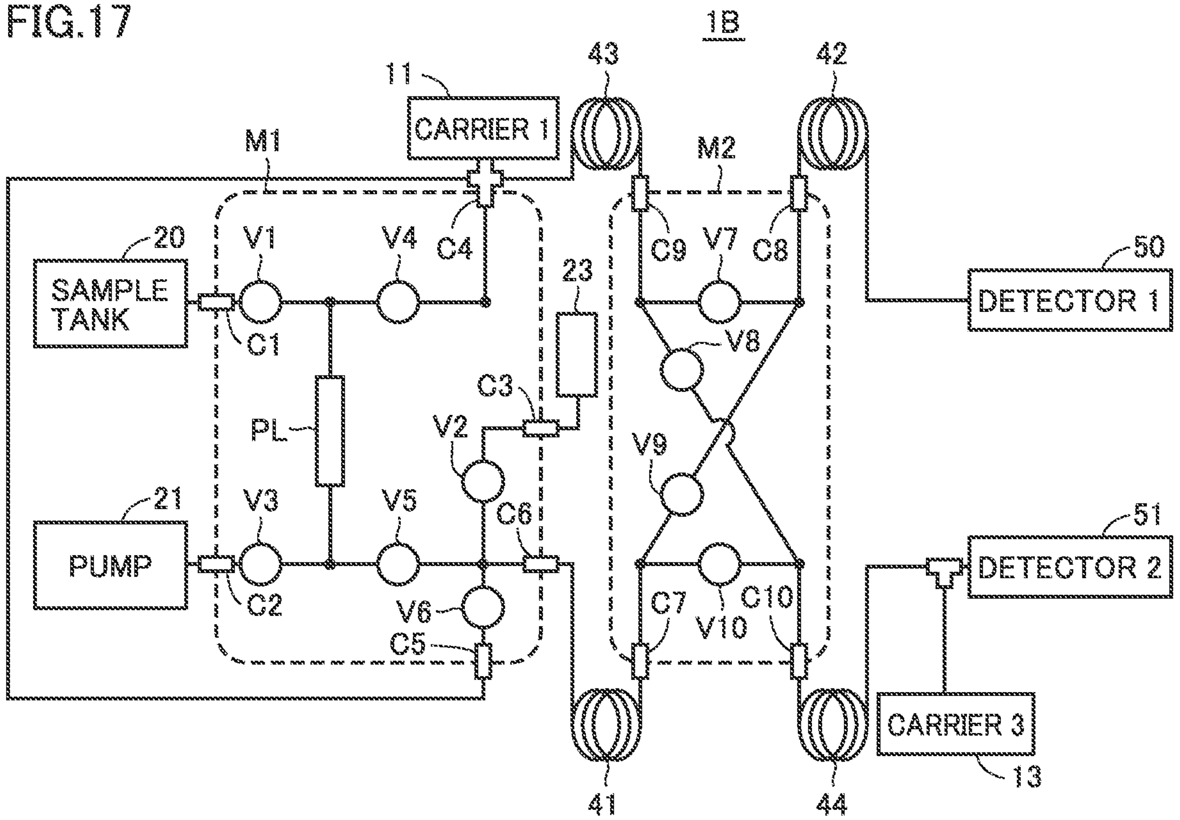
FIG. 17 is a diagram (No. 3) schematically showing an exemplary configuration of a gas analysis system.

FIG. 17 is a diagram schematically showing an exemplary configuration of a gas analysis system 1B according to the present second modification. Gas analysis system 1B does not include carrier gas supply device 12 connected to connector C5 of gas analysis system 1 described above, but has connector C5 coupled to carrier gas supply device 11 instead. Gas analysis system 1B is otherwise the same in configuration as gas analysis system 1 described above. According to such a modification, carrier gas supply device 12 can be eliminated and hence cost as a whole can be reduced.

ASPECTS

The embodiments and the modification thereof described above are understood by a person skilled in the art as specific examples of aspects below.

(Clause 1) A gas analysis system according to one aspect includes a separator that separates sample gas into one or more gas components, a detector that detects the gas components that flow out of the separator, a flow channel fluidly connected to the separator and the detector, a plurality of valves provided on the flow channel, the plurality of valves being controllable independently of one another, and a controller that independently controls the plurality of valves. The plurality of valves have such an arrangement that a flow channel pattern is changeable between a first flow channel pattern and a second flow channel pattern in accordance with a controlled state for each of the plurality of valves. The controller includes a storage where information on the controlled state for each of the plurality of valves corresponding to the first flow channel pattern and the second flow channel pattern is stored and an output unit that generates signals for controlling the plurality of valves based on the information stored in the storage and outputs the signals to the plurality of valves.

According to the gas analysis system described in Clause 1, the plurality of valves are independently controlled so that the plurality of functions different in purpose from one another can be achieved. Therefore, the plurality of functions can be achieved without replacement of the hardware configuration of the flow channel.

(Clause 2) The gas analysis system described in Clause 1 may further include an input device that accepts a requested function from a user, and the output unit may specify the controlled state of the plurality of valves corresponding to the requested function inputted to the input device by referring to the information stored in the storage and output the control signals to the plurality of valves such that the specified controlled state is set.

According to the gas analysis system described in Clause 2, the requested function requested by the user can be performed by a simple operation to input the requested function to the input device.

(Clause 3) In the gas analysis system described in Clause 1 or 2, the separator may include a first column for primary separation and a second column for secondary separation for further separation of the gas component that flows out of the first column. The detector may include a first detector connected to the second column and a second detector not connected to the second column. The flow channel may include a sampler module arranged between an inflow portion into which sample gas flows and the first column and a switching module arranged among the first column, the second column, and the second detector.

According to the gas analysis system described in Clause 3, by control of the valves in the sampler module, the first column can be filled with sample gas. Furthermore, by changing the controlled state of the valves in the switching module, whether to supply sample gas that flows out of the first column to the second column or the second detector can be switched.

(Clause 4) In the gas analysis system described in Clause 3, the information stored in the storage includes information that defines correspondence between a plurality of functions different in purpose from one another and the controlled state of the plurality of valves. The plurality of functions may include a sampling function to sample a constant amount of sample gas, a first cut function to detect at least one component in sample gas with the first detector or the second detector and to emit a remaining component to the outside, a second cut function to detect at least one component in sample gas with the first detector and to detect a remaining component with the second detector, and a back flash function to cause gas in the separator to flow back to be emitted to the outside.

According to the gas analysis system described in Clause 4, the plurality of valves are independently controlled, so that such basic functions as the sampling function, the first cut function (pre-cut function), the second cut function (heart-cut function), and the back flash function can be performed.

It should be understood that the embodiments disclosed herein are illustrative and non-restrictive in every respect. The scope of the present invention is defined by the terms of the claims rather than the description of the embodiments above and is intended to include any modifications within the scope and meaning equivalent to the terms of the claims.

REFERENCE SIGNS LIST

1, 1A, 1B gas analysis system; 11, 12, 13 carrier gas supply device; 20 sample tank; 21 pump; 23, 24 vent; 41 to 44 column; 50, 51 detector; 60 input device; 70 display; 80 drive device; 100 controller; 110 processor; 120 storage; 200 microvalve; 220 base layer; 221, 241 recess; 222, 223, 224, 232, 252, 253, 254 opening; 225 bottom; 230 diaphragm layer; 233 flexible portion; 234 rigid portion; 240 cover layer; 250 flow channel member; 262 supply port; 263 flow inlet; 264 flow outlet; C1 to C10 connector; M1 sampler module; PL sample loop; V1 to V10 switching valve.

The invention claimed is:

1. A gas analysis system comprising:

a separator that separates sample gas into one or more gas components; the separator includes a first column for primary separation, and a second column for secondary separation for further separation of the gas component that flows out of the first column;

a detector that detects the gas components that flow out of the separator; the detector includes a first detector connected to the second column, and a second detector not connected to the second column;

a flow channel fluidly connected to the separator and the detector; the flow channel includes a sampler module arranged between an inflow portion into which sample gas flows and the first column, and a switching module arranged among the first column, the second column, and the second detector;

a plurality of valves provided on the flow channel, the plurality of valves being controllable independently of one another; and a controller that independently controls the plurality of valves, wherein the plurality of valves have such an arrangement that a flow channel pattern is changeable between a first flow channel pattern and a second flow channel pattern in accordance with a controlled state for each of the plurality of valves, the controller includes a storage where information on the controlled state for each of the plurality of valves corresponding to the first flow channel pattern and the second flow channel pattern is stored, and an output unit that generates signals for controlling the plurality of valves based on the information stored in the storage and outputs the signals to the plurality of valves, and the information stored in the storage includes information that defines correspondence between a plurality of functions different in purpose from one another and the controlled state of the plurality of valves.

2. The gas analysis system according to claim 1, further comprising an input device that accepts a requested function from a user, wherein the output unit specifies the controlled state of the plurality of valves corresponding to the requested function inputted to the input device by referring to the information stored in the storage and outputs the control signals to the plurality of valves such that the specified controlled state is set.

3. The gas analysis system according to claim 1, wherein the plurality of functions include a sampling function to sample a constant amount of sample gas, a first cut function to detect at least one component in sample gas with the first detector or the second detector and to emit a remaining component to outside, a second cut function to detect at least one component in sample gas with the first detector and to detect a remaining component with the second detector, and a back flash function to cause gas in the separator to flow back to be emitted to the outside.

4. The gas analysis system according to claim 1, wherein the plurality of valves are mounted on a flow channel plate.

5. The gas analysis system according to claim 1, wherein the plurality of valves are microvalves, each of the microvalves including a diaphragm layer and being made of silicon.

* * * * *